(12) United States Patent
Darsey

(10) Patent No.: US 9,291,157 B1
(45) Date of Patent: Mar. 22, 2016

(54) AUTOMATED SYSTEM FOR PRESSURE PULSATION DAMPENING

(71) Applicant: Fred Rusty Darsey, Cypress, TX (US)

(72) Inventor: Fred Rusty Darsey, Cypress, TX (US)

( * ) Notice: Subject to any disclaimer, the term of this patent is extended or adjusted under 35 U.S.C. 154(b) by 274 days.

(21) Appl. No.: 14/100,611

(22) Filed: Dec. 9, 2013

Related U.S. Application Data

(60) Division of application No. 12/949,524, filed on Nov. 18, 2010, now Pat. No. 8,613,607, which is a continuation-in-part of application No. 12/751,028, filed on Mar. 31, 2010, now abandoned.

(51) Int. Cl.
| | |
|---|---|
| *F04B 39/00* | (2006.01) |
| *F01N 1/16* | (2006.01) |
| *F01N 1/18* | (2006.01) |
| *F16L 55/027* | (2006.01) |

(52) U.S. Cl.
CPC .............. *F04B 39/0027* (2013.01); *F01N 1/16* (2013.01); *F01N 1/18* (2013.01); *F04B 39/0055* (2013.01); *F04B 39/0072* (2013.01); *F16L 55/027* (2013.01)

(58) Field of Classification Search
CPC ............. F04B 39/0027; F04B 39/0055; F04B 39/0061; F04B 39/0072; F04C 29/065; F04C 29/066; F01N 1/18; F01N 1/163
USPC .......... 417/312, 295, 441, 540; 181/197, 215, 181/241, 271, 403; 251/205, 206, 208
See application file for complete search history.

(56) References Cited

U.S. PATENT DOCUMENTS

| | | | | |
|---|---|---|---|---|
| 2,518,869 A * | 8/1950 | Corless | ..................... | F01N 1/16 181/277 |
| 2,767,681 A * | 10/1956 | Pontius | ................ | F16K 37/0016 116/277 |
| 3,141,519 A * | 7/1964 | Bottum | .................... | F01N 1/165 181/241 |
| 3,419,029 A * | 12/1968 | Straub | ................. | A61M 16/208 128/205.24 |
| 4,411,288 A * | 10/1983 | Gain, Jr. | .................. | F16K 31/53 116/277 |
| 4,718,445 A * | 1/1988 | Lundberg | ............ | F16K 37/0008 116/201 |
| 5,076,308 A * | 12/1991 | Cohen | ................. | F16K 37/0016 116/277 |
| 5,540,558 A * | 7/1996 | Harden | .................... | F04B 49/03 251/129.19 |
| 5,771,851 A * | 6/1998 | McLean | ............. | F02M 35/1261 123/184.57 |
| 5,860,452 A * | 1/1999 | Ellis | ....................... | F16L 55/054 138/26 |
| 5,930,371 A * | 7/1999 | Cheng | ...................... | F01N 1/023 381/71.5 |
| 6,367,580 B1 * | 4/2002 | Chang | ....................... | F01N 1/08 181/219 |
| 6,647,983 B2 * | 11/2003 | Smith | ................. | A61M 16/204 128/205.11 |
| 7,213,615 B2 * | 5/2007 | Cueni | ................. | F16K 11/0743 137/625.46 |
| 7,334,663 B2 * | 2/2008 | Nakayama | ......... | F02M 35/1255 123/184.55 |
| 2004/0045767 A1 * | 3/2004 | Byrne | ..................... | F02C 7/045 181/241 |
| 2004/0118632 A1 * | 6/2004 | Ciray | ....................... | F01N 1/02 181/219 |
| 2008/0314679 A1 * | 12/2008 | Rowe | ........................ | F01N 1/16 181/241 |
| 2009/0191076 A1 * | 7/2009 | Deffenbaugh | ...... | F04B 39/0055 417/540 |

* cited by examiner

*Primary Examiner* — Alexander Comley
(74) *Attorney, Agent, or Firm* — Buskop Law Group, PC; Wendy Buskop

(57) ABSTRACT

An automated system for dampening pulsation of a medium, wherein the system comprises a pressure pulsation dampener, a transducer, and a control unit for instructing a motor to move the choke plate depending on signals sent from the transducer. The pressure pulsation dampener has a housing, a choke plate, a shaft, an indicator plate, a stop pin and a removable fastener for engaging at least one of the plurality of indicator openings and securing to a portion of the outlet half housing.

18 Claims, 6 Drawing Sheets

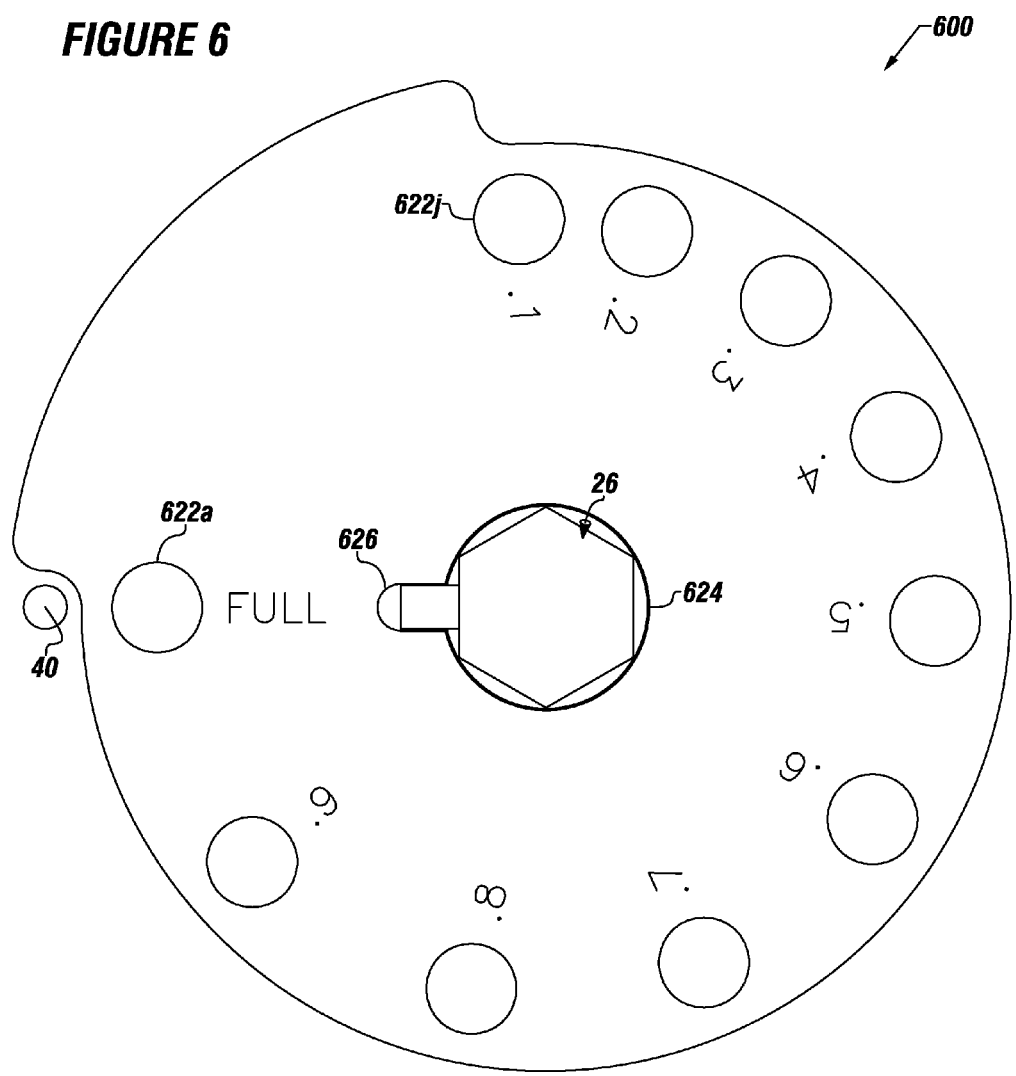

AUTOMATED SYSTEM FOR PRESSURE PULSATION DAMPENING

CROSS REFERENCE TO RELATED APPLICATIONS

The present application is a Divisional of U.S. patent application Ser. No. 12/949,524 filed on Nov. 18, 2010, entitled "PRESSURE PULSATION DAMPENER," issued as U.S. Pat. No. 8,613,607 on Dec. 214, 2013, which is a Continuation in Part of U.S. patent application Ser. No. 12/751,028 filed on Mar. 31, 2010, entitled "Pulsation Dampener for Gas Compressors Having Selectable Size Choke Openings." These references are incorporated herein in their entirety.

FIELD

The present embodiments generally relate to an automated system for pressure pulsation dampening.

BACKGROUND

A need exists for an automated system for pressure pulsation dampening that optimally reduces or greatly eliminates square root error.

A need exists for an automated system for pressure pulsation dampening that can be used to provide pulsation dampening to a medium flowing in a conduit. The medium can be a vapor, liquid, or multi-phase medium.

A further need exists for an automated system for pressure pulsation dampening that optimizes the efficiency of an up stream compressor often associated with the use of a choke plate in flow systems.

The present embodiments meet these needs.

BRIEF DESCRIPTION OF THE DRAWINGS

The detailed description will be better understood in conjunction with the accompanying drawings as follows:

FIG. 6 depicts an indicator plate according to one or more embodiments.

Figure 1:
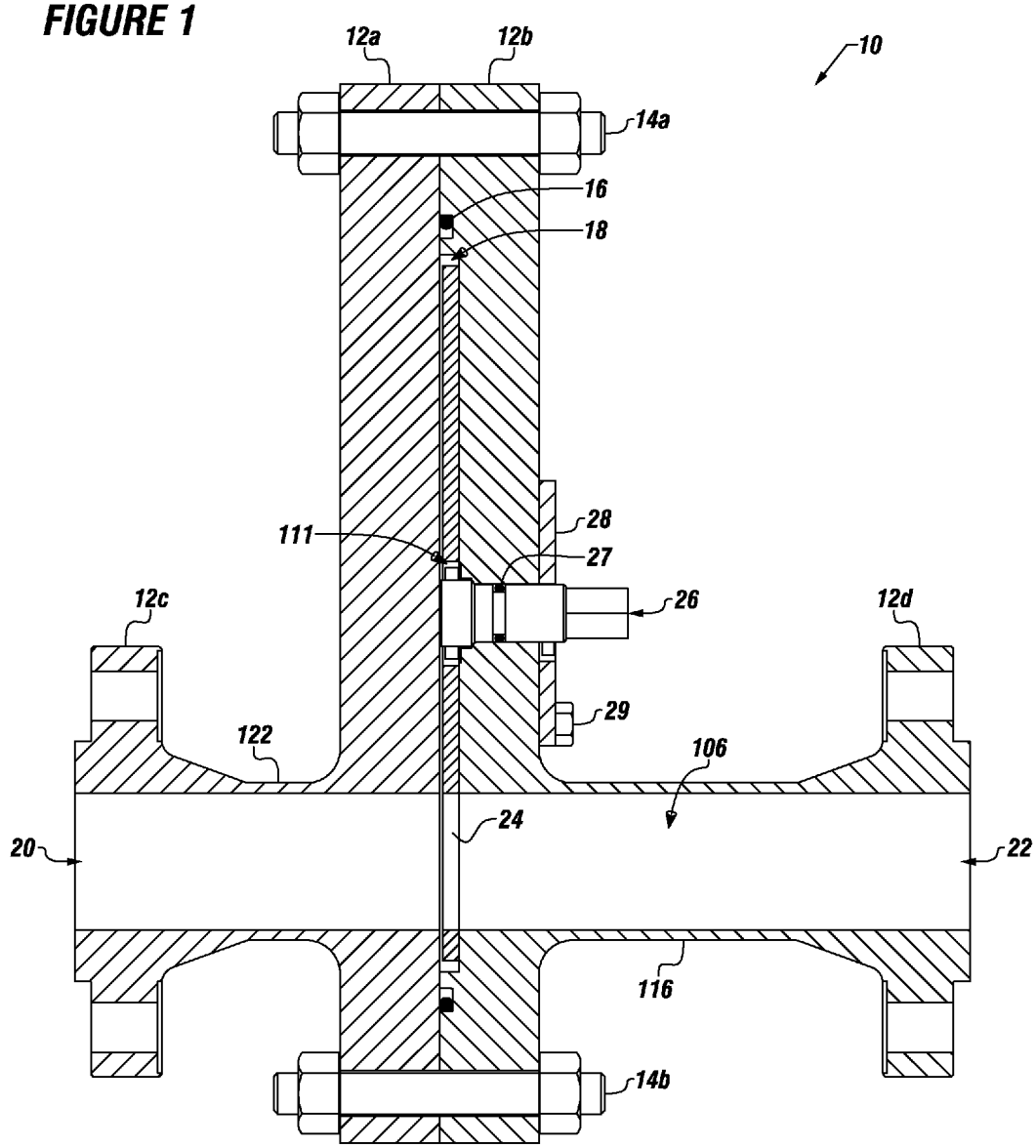
FIG. 1 depicts a cut view of a pressure pulsation dampener for use in a compressible medium according to one or more embodiments.

The present embodiments are detailed below with reference to the listed Figures.

DETAILED DESCRIPTION OF THE EMBODIMENTS

Before explaining the present systems in detail, it is to be understood the systems are not limited to the particular embodiments and the apparatus and system can be practiced or carried out in various ways.

The present embodiments relate to an automated system for pressure pulsation dampening.

A pressure pulsation dampener can be used on a medium flowing in a flow system. The medium can be a natural gas stream. The medium can be natural gas from a compressor, natural gas from a tank, natural gas from a gathering site, natural gas from a separator, or combinations thereof. The medium can be a vapor, a liquid, or a multiphase stream. The medium can have a pressure from approximately fifty psig to about four hundred psig (pound-force per square inch gauge). For example, the medium can be a compressible natural gas stream.

The pressure pulsation dampener can have an outlet half housing, an inlet half housing, a choke plate, a shaft, an indicator plate, a stop pin, and a removable fastener.

The outlet half housing can have an outlet front side and an outlet back side. The outlet back side can have a recess formed therein. The recess can be a flat cylindrical surface.

The outlet front side and the outlet back side can have a shaft hole formed therethrough. An outlet pipe extension can be disposed in at least a portion of the outlet half housing side. The outlet pipe extension can be configured to engage a downstream conduit. For example, the outlet pipe extension can be integral with and formed perpendicular to the outlet back side, and can engage a downstream tubular member. An inlet pipe extension can be disposed in at least a portion of the inlet half housing side. The inlet pipe extension and the outlet pipe extension can have identical lengths.

The inlet half housing can have an inlet front side and an inlet back side. The inlet back side can be engaged with the outlet back side. As such, a seal can be formed between the outlet back side and inlet front side. The inlet pipe extension can be disposed within a portion of the inlet half housing. The inlet pipe extension can be in fluid communication with the outlet pipe extension and with an upstream tubular member. As such, the inlet pipe extension can allow the medium to travel from the upstream to the downstream, such as from an upstream tubular member to a downstream tubular member via outlet half housing and inlet half housing.

The outlet half housing and inlet half housing can have an overall diameter from about six inches to about thirty inches. The outlet half housing and inlet half housing can have a thickness from about three inches to about three-fourths of one inch. A plurality of removable fasteners can be used to connect the inlet half housing to the outlet half housing.

The outlet half housing and inlet half housing can be at least partially made from steel, steel alloys, coated steel, iron, durable pressure resistant non-deforming polymers, or combinations thereof.

The choke plate can be disposed in the recess formed into the outlet back side of the outlet half housing. In one or more embodiments, the choke plate can engage the flow path formed by the inlet pipe extension. For example, the choke plate can intersect the flow path. The choke plate can create a variable restriction on the medium through the flow path.

The choke plate can have a diameter larger than an inner diameter of the upstream tubular member. For example, the diameter of the choke plate can be from about three to about seven times larger than the inner diameter of the upstream tubular member.

The choke plate can have a thickness from about one-sixteenth of an inch to about two inches. For example, the thickness of the choke plate can be one-eighth of an inch. The choke plate can have a semicircular shape containing openings along only a curved portion thereof.

In one or more embodiments, a shaft can be disposed through the outlet half housing. The shaft can be used to move a rectangular choke plate to one or more positions. The positions can selectively present individual openings to the flow path to dampen a pulsation frequency rate of the medium through the flow path. As such, a user can selectively control the pulsation frequency in the medium using a corresponding opening in the rectangular sliding choke plate.

The choke plate can include a centrally formed shaft hole and a plurality of openings. The plurality of openings can be disposed around a perimeter of the choke plate. The plurality of openings can be used to allow the choke plate to create the variable restriction. The plurality of openings can have or form differing flow areas. In one or more embodiments, one or more openings of the plurality of openings can have sequentially smaller inner diameters. For example, the inner diameters of a first opening, such as an opening disposed at a twelve 'o'clock position on the choke plate, can have a one and a half inch diameter, and a second opening, disposed at a one 'o'clock position on the choke plate, can have a one and a quarter inch diameter. The flow areas of the openings can decrease sequentially in a counter clockwise or clockwise direction.

Each of the openings of the plurality of openings can provide blockage in the pipe. The blockage can range from zero percent blockage to ninety percent blockage of the flow path. The plurality of openings can be configured in an order of ascending or descending blockage percentages.

In one or more embodiments, the choke plate can have openings with inner diameters from about 0.03 inches to about 5.5 inches. The size of the openings in the choke plate can be a function of pipe size, schedule, and flow range. For example, if a pipe is a schedule 40, 2 inch class 600 lb, the opening can range from 0.20 inches to 1.25 inches.

In one or more embodiments, the shaft can be disposed through the outlet half housing. The shaft can be used to rotate the choke plate to a desired opening. The desired opening can be selectively presented. Accordingly, the desired opening can be operatively aligned with the flow path, and can dampen the pulsation frequency rate of the medium through the flow path.

The indicator plate can have a plurality of indicator openings. The plurality of indicator openings can correspond to the plurality of openings in the choke plate. For example, a first indicator opening can be associated with the first opening of the plurality of openings formed through the choke plate. A marking or other tag, such as an RFID tag (radio frequency identification tag) or electro-magnetic tag, can be placed on or proximate to the first indicator opening, and the marking or tag can be configured to indicate that the first indicator opening is associated with the first opening of the plurality of openings formed through the choke plate.

The indicator plate can also include a shaft hole. The shaft hole can be configured to be concentrically aligned with the shaft. When the shaft hole is concentrically aligned with the shaft, the indicator openings can be aligned with their associated openings, allowing for visual indication of the plurality of openings in the choke plate.

Over-rotation of the indicator plate and the choke plate can be prevented by a stop pin disposed in the front side of the outer half housing.

The rotation of the indicator plate can be prevented by a removable fastener at least partially disposed through one of the indicator openings and through a portion of the front side of the outer half housing.

In one or more embodiments, a lock out device can be disposed on the front side of the outlet half housing over at least a portion of the indicator plate. The lock out device can be used to prevent unauthorized tampering with the indicator plate. The lock out device can include a block. The block can be non-removably secured to the outlet half housing. The block can be used to engage the removable fastener, such as a set screw. As such, the block can prevent movement of the indicator openings and rotation of the indicator plate.

The block can have one or more lock holes disposed therethrough. The lock holes can allow a lock to be disposed through the block.

A first seal can be disposed between the inlet back side and the outlet back side. The first seal can be on a first side of the flow path. A second seal can be disposed between the inlet back side and the outlet back side, and on a second side of the flow path. The first and second seals can be elastomeric or other materials. For example, the first and second seals can be rubber o-rings. The first and second seals can be configured to provide positive pressure for the flow path, and to control impact of the medium in the recess in the outlet back side.

In one or more embodiments, a first metal to metal seal can be formed between the inlet back side and the outlet back side on a first side of the flow path. A second metal to metal seal can be formed between the inlet back side and the outlet back side on a second side of the flow path. The first and second metal to metal seals can provide a positive pressure in the flow path.

One or more first flange type connectors can connect the outlet pipe extension to a downstream pipe. A second flange type connector can connect the inlet pipe extension to an upstream pipe.

In one or more embodiments, a second choke plate can be disposed in parallel to the first choke plate. The second choke plate can have a plurality inner diameters that can be different from the diameters of the plurality of openings formed in the first choke plate.

In one or more embodiments, the pressure pulsation dampener can be automated. As such, the automated pressure pulsation dampener can include a motor. The motor can be configured to rotate the shaft. The motor can be a direct drive motor, a variable drive motor, a remote controlled motor, an electric motor, or the like. The motor can be connected to a motor driver. The motor driver can be a speed reducer, a step gear assembly, a drive box, an actuator, a transmission, or other gear assembly.

A controller can be in communication with the motor. The motor can drive the motor drive to move the choke plate. The controller can include a processor. The processor can be in communication with a data storage.

The data storage can include computer instructions for processing signals from at least one upstream transducer connected to the upstream tubular member, and from at least one downstream transducer connected to the downstream tubular member. The signals can be processed into monitored frequency rates. The data storage can include computer instructions for comparing the monitored frequency rates to preset limits in the data storage. The data storage can include computer instructions for instructing the processor to activate the motor to rotate the shaft to a pre-designated position in order to rotate the choke plate, providing an opening that minimizes pulsation frequency and optimizes flow measurement accuracy.

The transducers can be wireless and can have separate power supplies for connecting to the controller. The controller can be in wireless communication with the motor.

In one or more embodiments, the automated pressure pulsation dampener can include an analog to digital converter. The analog to digital converter can be disposed between the transducers and the controller, and can be in communication therewith. The analog to digital converter can be one similar or substantially similar to those known to one skilled in the art.

In one or more embodiments, the automated pressure pulsation dampener can include a controller that can activate the motor. The controller can control the rotation of the motor such that the rotation of the shaft moves the choke plate to an opening that minimizes pulsation frequency and that optimizes flow measurement accuracy using existing customer compressor data.

Accordingly, the automated pressure pulsation dampener can allow a user to selectively control pulsation frequency in the medium using a corresponding opening in the choke plate automatically while maintaining a visual indication of the opening currently being used in the flow path by the choke plate.

Turning now to the Figures, FIG. 1 depicts a cut view of a pressure pulsation dampener 10 for use in a compressible medium according to one or more embodiments. The pressure pulsation dampener 10 can include an outlet half housing 12b, an inlet half housing 12a, a choke plate 24, a shaft 26, and a centrally formed shaft hole 111.

The outlet half housing 12b can have an outlet front side and a outlet back side. A recess 18 can be formed in the outlet back side. The outlet half housing 12b can have an outlet pipe extension 116. The outlet pipe extension 116 can be formed on or otherwise connected to the outlet half housing 12b.

The inlet half housing 12a can have an inlet front side and an inlet back side. The inlet back side can engage the outlet back side. As such, a seal can be formed between the inlet back side and the outlet back side. The inlet half housing 12a can also include an inlet pipe extension 122 formed thereon or connected thereto.

The inlet half housing 12a and the outlet half housing 12b can be connected to one another, such as by a first fastener 14a and a second fastener 14b.

A flow path 106 can be formed between the outlet pipe extension 116 and the inlet pipe extension 122. The flow path 106 can have an inlet 20 and an outlet 22. The inlet 20 can be in fluid communication with a downstream tubular member. The outlet 22 can be in fluid communication with an upstream tubular member.

The choke plate 24 can be disposed in the recess 18. The choke plate 24 can be at least partially disposed within the flow path 106. Accordingly, the flow path 106 can create a variable restriction on a medium flowing through the flow path 106. The centrally formed shaft hole 111 can be disposed through the choke plate 24.

The centrally formed shaft hole 111 can be aligned with a hole formed through the inlet half housing 12a or the outlet half housing 12b.

The shaft 26 can be disposed through the hole formed through the inlet half housing 12a, the outlet half housing 12b, or both and into the centrally formed shaft hole 111. The shaft 26 can engage and rotate the choke plate 24.

One or more first seals 16 can be disposed about or adjacent to the choke plate 24. One or more shaft seals 27 can be disposed adjacent to or about the shaft 26.

A removable fastener 29, such as a set screw, can be used to connect an indictor plate 28 to the outlet half housing 12b.

A first flange type connector 12c can be disposed on the inlet pipe extension 122, and a second flange type connector 12d can be disposed on the outlet pipe extension 116. The flange type connectors 12c and 12d can be used to connected the pipe extensions 116 and 122 to adjacent tubular members.

Figure 2:
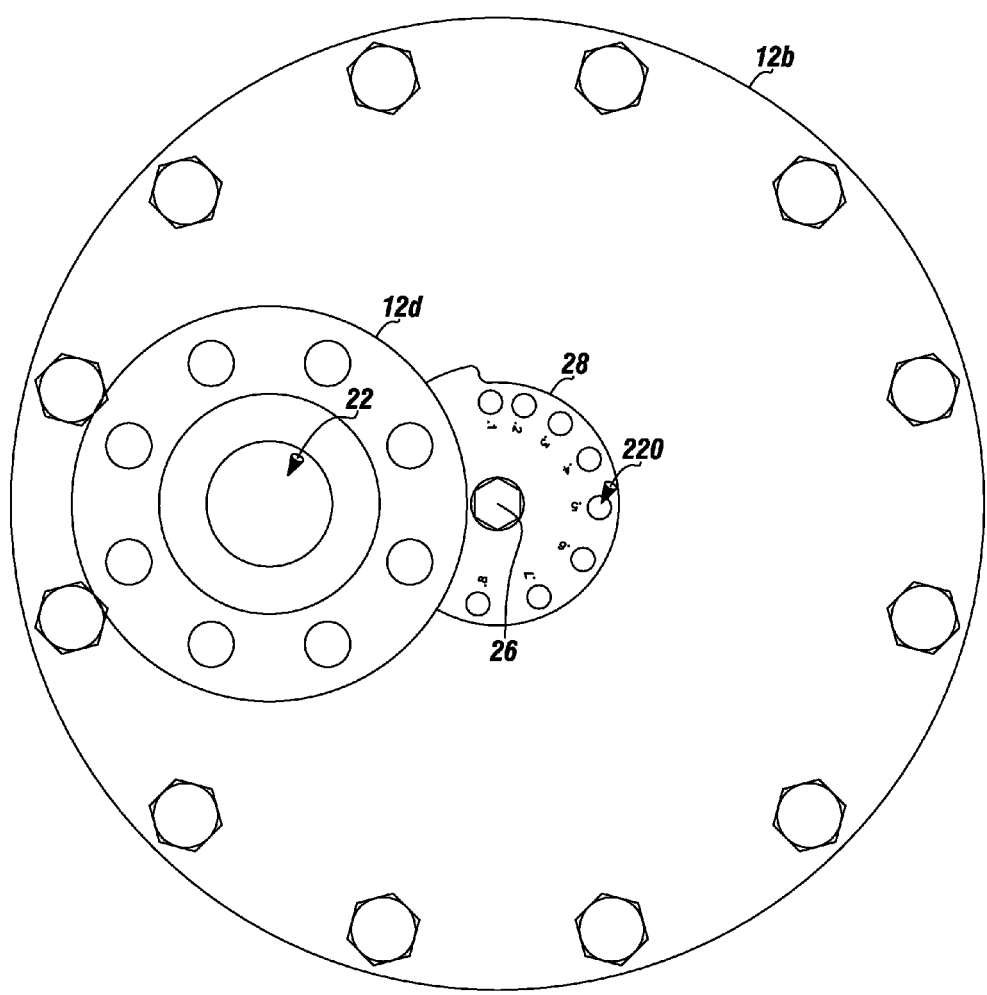
FIG. 2 depicts an outlet port end view of an outlet half housing of FIG. 1.

FIG. 2 depicts an end view of the outlet house half housing 12b showing an outlet port 22. The shaft 26 can be disposed through the indicator plate 28. The indicator plate 28 can have a plurality of indicator openings 220. Each indicator opening 220 can be associated with an opening formed in the choke plate. As such, by viewing the indicator plate 28, one can determine what size of an opening in the choke plate is being used. Also depicted is the second flange type connector 12d.

Figure 3:
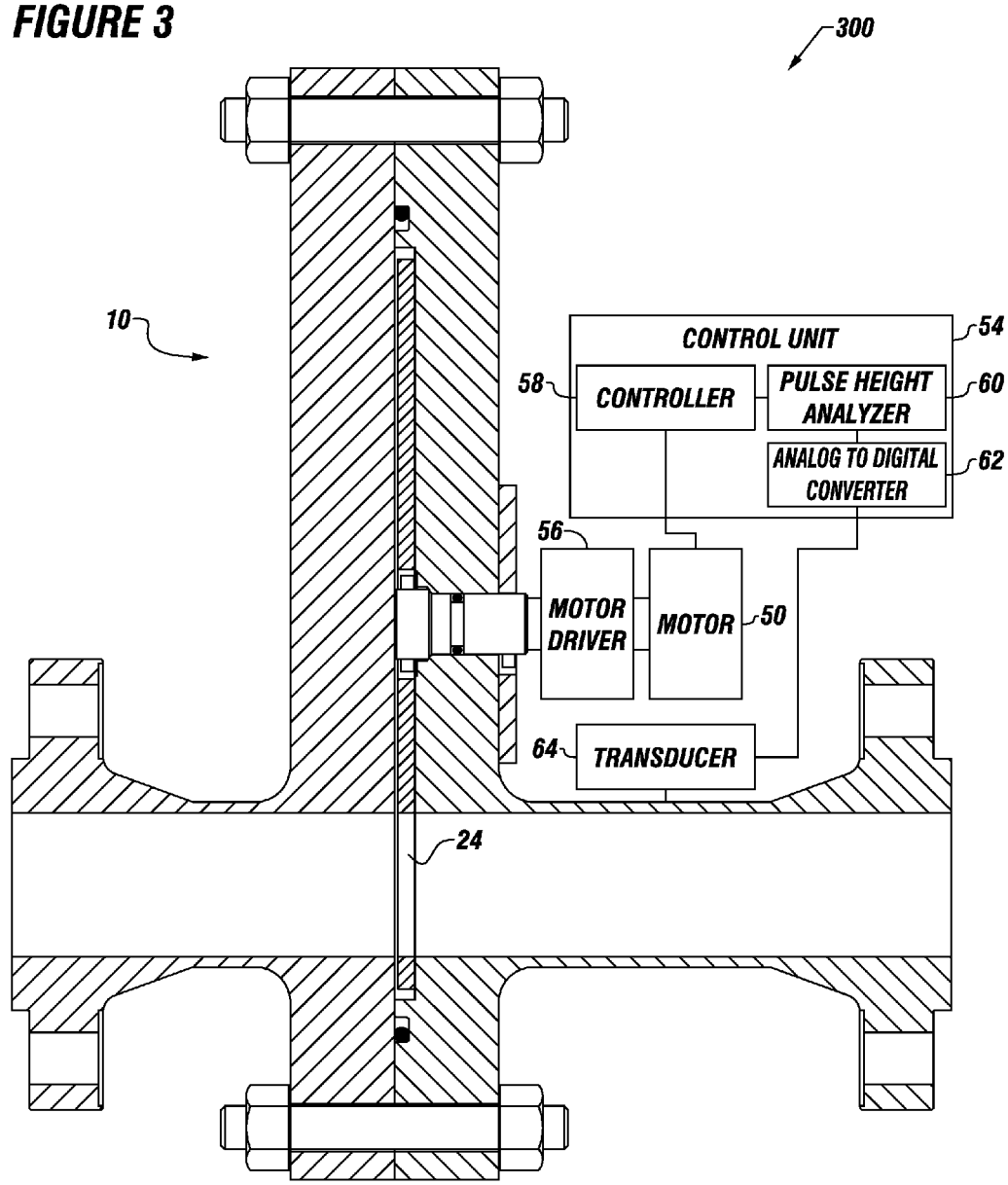
FIG. 3 depicts an automated system for pulsation dampening according to one or more embodiments.

FIG. 3 depicts an automated system for pulsation dampening 300 according to one or more embodiments. The automated system for pulsation dampening 300 can include the pressure pulsation dampener 10, a transducer 64, a motor 50, and a control unit 54.

The control unit 54 can include an analog to digital converter 62, a pulse height analyzer 60, and a controller 58. A motor driver 56 can be in mechanical and/or electrical communication with the motor 50.

The control unit 54 can be in communication with the transducer 64. For example, the transducer 64 can send a signal to the analog to digital converter 62. The analog to digital converter 62 can communicate the signal to the pulse height analyzer 60. The pulse height analyzer 60 can determine an amplitude of the pressure pulse measured by the transducer 64.

The pulse height analyzer 60 can communicate the determined amplitude of the pressure pulse measured by the transducer 64 to the controller 58. The controller 58 can use the determined amplitude of the pressure pulse measured by the transducer 64 to determine what opening on the choke plate 24 should be used, and to instruct the motor driver 56 to allow the motor 50 to rotate a predetermined amount. When the motor 50 rotates the predetermined amount, the preselected opening can be aligned with the flow path.

Figure 4:
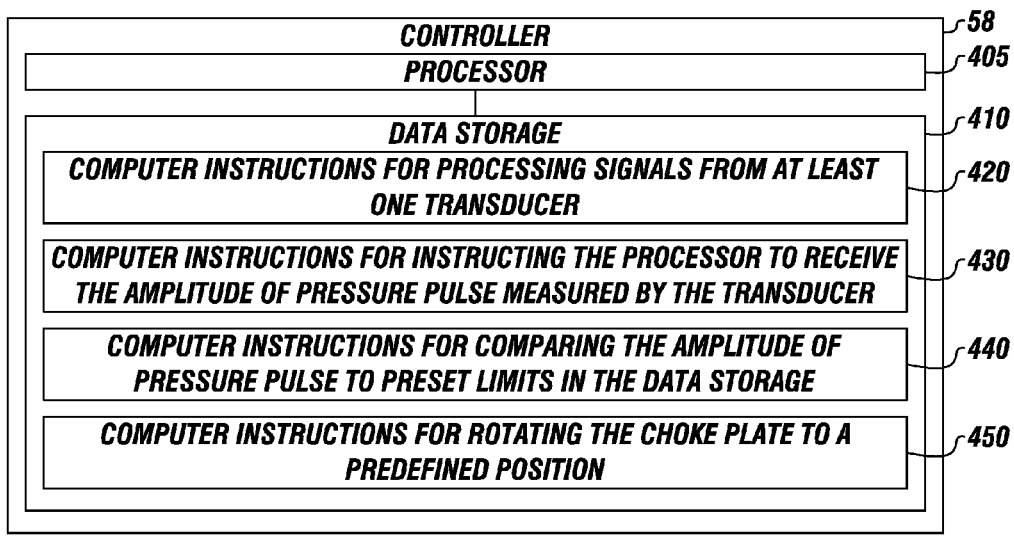
FIG. 4 depicts a schematic of a controller according to one or more embodiments.

FIG. 4 depicts an embodiment of the controller 58 according to one or more embodiments. The controller 58 can include a processor 405 in communication with a data storage 410.

The processor 405 can be a Pentium processor, a micro processor, or a similar device. The data storage 410 can be any computer readable medium, such as a flash drive, a compact disc, a hard drive, or the like.

The data storage 410 can include computer instructions for processing signals from at least one transducer 420. For example, the computer instructions for processing signals from at least one transducer can instruct the processor 405 to communicate with the analog to digital converter or with the transducer.

The data storage 410 can also include computer instructions for instructing the processor to receive the amplitude of pressure pulse measured by the transducer 430. For example, these computer instructions can instruct the processor 405 to communicate with a pulse height analyzer.

The data storage 410 can also include computer instructions for comparing the amplitude of pressure pulse to preset limits in the data storage 440. For example, the data storage 410 can have one or more charts that associate an opening in the choke plate to a desired amplitude of pressure pulse based upon the monitored amplitude of pressure pulse.

The data storage 410 can also include computer instructions for rotating the choke plate to a predefined position 450. For example, the predefined position can be associated with an opening determined by the computer instructions for comparing the amplitude of pressure pulse to preset limits in the data storage 440. The predefined opening can minimize pulsation frequency and optimize flow measurement.

Figure 5:
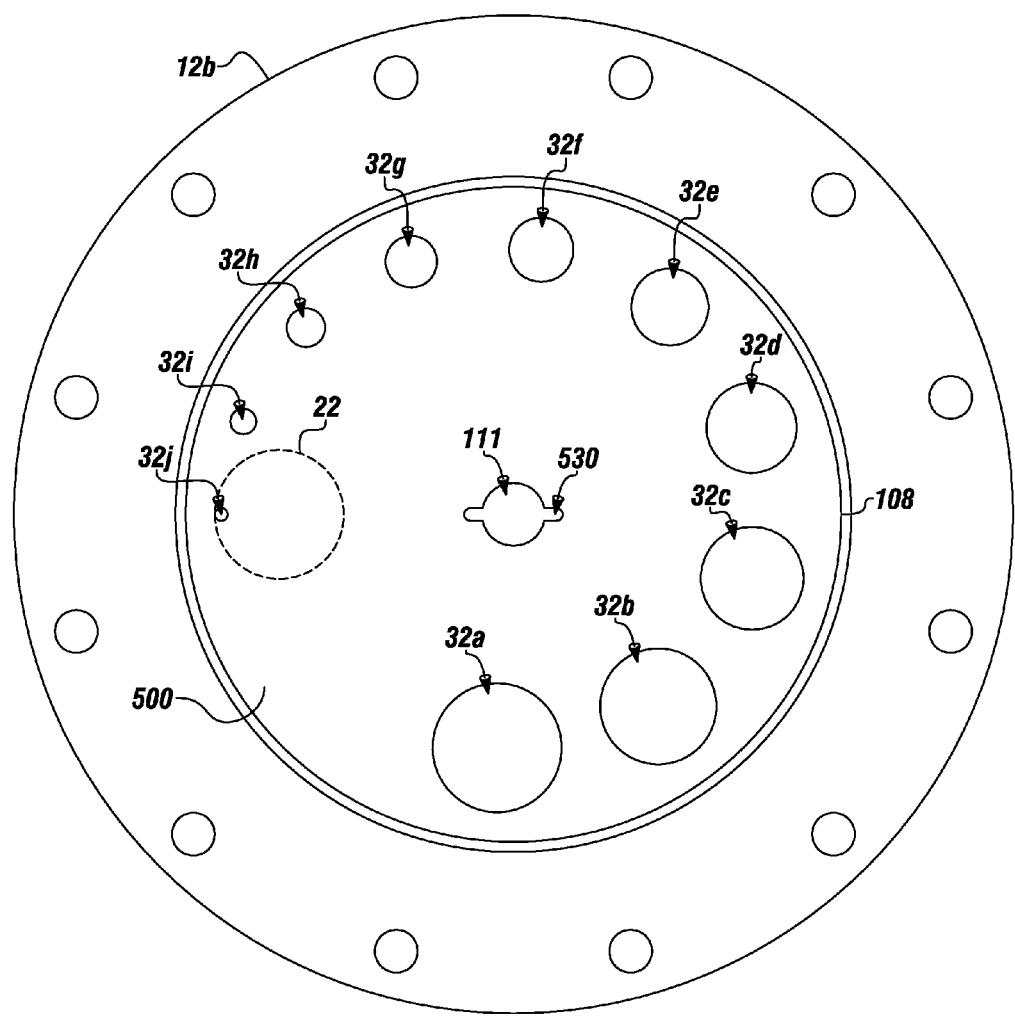
FIG. 5 depicts a choke plate according to one or more embodiments.

FIG. 5 depicts a choke plate 500 according to one or more embodiments. The choke plate 500 can include a plurality of openings 32a-32j. The plurality of openings 32a-32j can be disposed about a perimeter 108 of the choke plate 500. The plurality of openings 32a-32j can be sequentially arranged. For example, a first opening 32a can be one inch in diameter, a second opening 32b can be ¾ of an inch in diameter, a third opening 32c can be ½ of an inch in diameter, and so forth.

The centrally formed shaft hole 111 can have one or more key slots 530. The key slot 530 can be configured to engage a knob or ridge formed on a shaft, such as the shaft depicted in FIG. 1. The choke plate 500 can be at least partially encased by the outlet half housing 12b.

As the choke plate 500 is rotated, at least one of the plurality of openings 32a-32j or at least a portion of one or more of the plurality of openings 32a-32j can be located in the flow path shown above in FIG. 1.

FIG. 6 depicts an indicator plate 600 according to one or more embodiments. The indicator plate 600 can have a shaft hole 624 formed therethrough. The shaft hole 624 can have one or more key slots 626. The key slot 626 can secure the indicator plate 600 to the shaft 26.

The indicator plate 600 can have one or more indicator openings, such as first indicator opening 622a and tenth indicator opening 622j. The indicator opening 622a and 622j can correspond to an opening in the choke plate.

A stop pin 40 can be provided to disable rotation of the indicator plate 600 and the choke plate into any position which would close flow through the flow path.

While these embodiments have been described with emphasis on the embodiments, it should be understood that within the scope of the appended claims, the embodiments might be practiced other than as specifically described herein.

What is claimed is:

1. An automated system for dampening pulsation of a medium, wherein the system comprises:
    a. a pressure pulsation dampener for use on a medium, the pressure pulsation dampener comprising:
        (i) an outlet half housing comprising a recess formed into a portion thereof and a shaft hole formed therethrough, wherein an outlet pipe extension having an outlet port is disposed on the outlet half housing;
        (ii) an inlet half housing configured to secure to the outlet half housing, wherein an inlet pipe extension having an inlet port is disposed on the inlet half housing, and wherein a flow path is formed between the inlet port and the outlet port when the outlet half housing is secured to the inlet half housing;
        (iii) a choke plate disposed in the recess and at least partially disposed within the flow path, wherein the choke plate comprises: a centrally formed shaft hole and a plurality of openings disposed about a perimeter of the choke plate;
        (iv) a shaft disposed through the outlet half housing for moving the choke plate to selectively present individual openings of the plurality of openings to the flow path;
        (v) an indicator plate comprising a plurality of indicator openings corresponding to the plurality of openings in the choke plate;
        (vi) a stop pin disposed on the outlet half housing for preventing over-rotation of the indicator plate and the choke plate; and
        (vii) a removable fastener for engaging one of the indicator openings and securing to a portion of the outlet half housing;
    b. a transducer;
    c. a motor connected to the shaft for rotating the shaft; and
    d. a controller in communication with the motor, wherein the controller comprises:
        (i) a processor; and
        (ii) a data storage in communication with the processor, wherein the data storage comprises computer instructions for comparing monitored frequency rates to preset limits in the data storage and for instructing the processor to activate the motor to rotate the shaft to a pre-designated position depending on the monitored frequency rates.

2. The system of claim 1, further comprising an analog to digital converter in communication with the transducer and the controller.

3. The system of claim 1, wherein each of the plurality of openings at least partially blocks flow through the flow path, and wherein the blockage of flow ranges from zero percent blockage to ninety percent blockage.

4. The system of claim 1, wherein the medium is a vapor, a liquid, or a mixed phase.

5. The system of claim 1, wherein the medium is a natural gas.

6. The system of claim 5, wherein the natural gas is a natural gas from a compressor, a natural gas from a tank, a natural gas from a gathering site, a natural gas from a separator, or combinations thereof.

7. The system of claim 1, wherein the outlet half housing and the inlet half housing have outer diameters from six inches to thirty six inches.

8. The system of claim 1, wherein the outlet half housing and the inlet half housing each comprise: steel, a steel alloy, a coated steel, iron, a durable pressure resistant non-deforming polymer, or combinations thereof.

9. The system of claim 1, further comprising:
    a. a first seal disposed between the outlet half housing and the inlet half housing on a first side of the flow path; and
    b. a second seal disposed between the outlet half housing and the inlet half housing on a second side of the flow path.

10. The system of claim 1, further comprising:
    a. a first metal to metal seal formed between the outlet half housing and the inlet half housing on a first side of the flow path; and
    b. a second metal to metal seal formed between the outlet half housing and the inlet half housing on a second side of the flow path.

11. The system of claim 1, wherein the choke plate has a diameter from three to seven times larger than an inner diameter of an upstream tubular member.

12. The system of claim 1, wherein the choke plate has a semicircular shape containing the plurality of openings along only a curved portion thereof.

13. The system of claim 1, further comprising:
    a. a flange type connector adjacent the outlet pipe extension; and
    b. another flange type connector adjacent the inlet pipe extension.

14. The system of claim 1, further comprising a second choke plate disposed in parallel to the choke plate, wherein the second choke plate comprises a second plurality of openings with different diameters than the plurality of openings of the choke plate.

15. The system of claim 1, wherein the medium has a pressure from fifty psig to five thousand psig.

16. The system of claim 1, wherein the choke plate is a circular shape, a rectangular shape, a curvilinear shape, or a parallelogram shape.

17. The system of claim 1, further comprising a lock out device disposed on a front side of the outlet half housing over at least a portion of the indicator plate for preventing unauthorized tampering with the indicator plate and the choke plate.

18. An automated system for dampening pulsation of a medium, wherein the system comprises:
  a. a pressure pulsation dampener for use on a medium, wherein the pressure pulsation dampener comprises:
    (i) an outlet half housing comprising a recess formed into a portion thereof and a shaft hole formed therethrough, wherein an outlet pipe extension having an outlet port is disposed on the outlet half housing;
    (ii) an inlet half housing configured to secure to the outlet half housing, wherein an inlet pipe extension having an inlet port is disposed on the inlet half housing, and wherein a flow path is formed between the inlet port and the outlet port when the outlet half housing is secured to the inlet half housing;
    (iii) a choke plate disposed in the recess and at least partially disposed within the flow path, wherein the choke plate comprises: a centrally formed shaft hole and a plurality of openings disposed about a perimeter of the choke plate;
    (iv) a shaft disposed through the outlet half housing for moving the choke plate to selectively present individual openings of the plurality of openings to the flow path;
    (v) an indicator plate comprising a plurality of indicator openings corresponding to the plurality of openings in the choke plate;
    (vi) a stop pin disposed on the outlet half housing for preventing over-rotation of the indicator plate and the choke plate; and
    (vii) a removable fastener for engaging one of the plurality of indicator openings and securing to a portion of the outlet half housing;
  b. a transducer; and
  c. a control unit for instructing a motor to move the choke plate depending on signals sent from the transducer.

* * * * *